3,367,058
ANIMATED FISHING LURE WITH BUOYANCY
CHANGING MEANS THEREIN
Anthony C. Dominique, 4749 DeMontluzin St.,
New Orleans, La. 70122
Filed Aug. 10, 1965, Ser. No. 478,646
7 Claims. (Cl. 43—42.06)

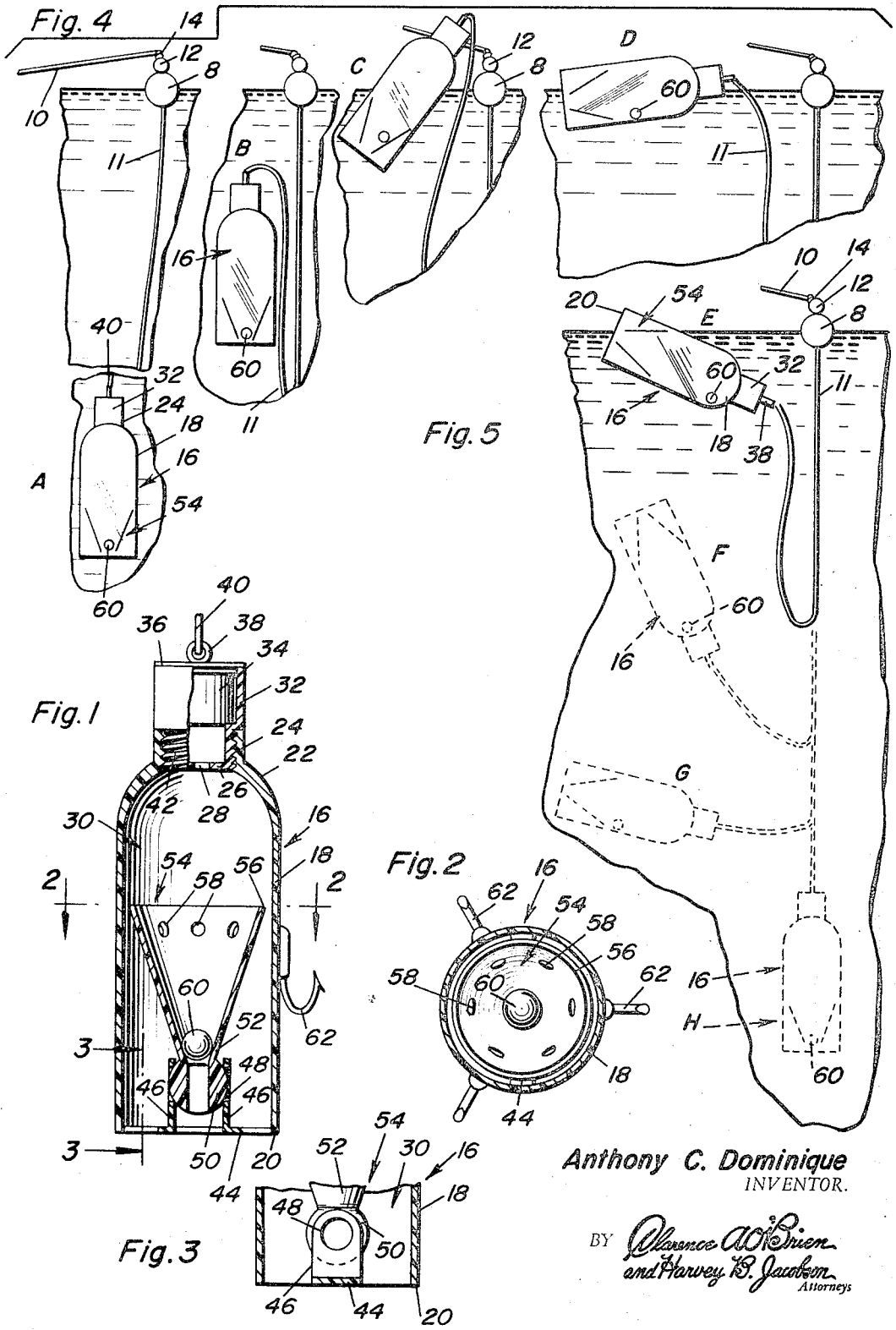

ABSTRACT OF THE DISCLOSURE

While the over-all tackle is of general significance, the essence of the concept has to do with an animated fishing lure characterized by a hollow cylindrical shell open at the bottom and provided at the top with a diving nose. The hollow portion constitutes a main chamber which functions to collect and trap a column of water. A neck at the top has an attachable cap-like closure the hollow portion of which constituties an auxiliary chamber which is adapted to contain a water-soluble gas-generating pellet. The pellet generates and discharges pressurized gas through a port from the auxiliary into the main chamber in a manner to expel the water in the main chamber and render the thus gas-charged body buoyant, causing it to float and swim upwardly to and through the water's surface. Self-shifting weight means, a simple ball, is confined in a special cup provided therefor in the lower part of the main chamber and functions to assist in capsizing the lure at the water's surface and then directing the nose downwardly to complete a first cycle of operation.

---

This invention relates, broadly construed, to fishing tackle and, more specifically, to a unique lure embodied in and constituting a novel feature of said tackle.

With respect first to the tackle as such, this aspect of the over-all concept has to do with a simple cork or equivalent float having a passage through which a portion of the line is freely slidable. The unique lure is attached to the lower or bottom end of the line. A depth regulating limit stop is located above the float and it too has a line passage which lines up with the float's passage when said limit stop comes to rest atop the float. A knot is tied in the line at a predetermined place and is adapted to abut the limit stop, whereby the portion of the line passing downwardly through both line passages is checked. Accordingly, the lure, which is specially constructed, dives to the depth determined by the position of the hand-tied knot. No troublesome line locking means is embodied in either the float or the limit stop. The lure dives down and comes to an abrupt capsizing stop.

The above-mentioned tackle is novel in that when fishing in shallow water the cork, limit stop, and knot are collectively adjusted and set so that the lure can dive and capsize when the bottom of the dive is reached, after which it swims up to and "pops" through the water's surface, automatically inverts, nose dives, and swims down to its starting level and is again readied to begin a second ascending and descending cycle. After completing his cast the angler can relax inasmuch as the lure is provided with self-contained buoyancy changing components which render the lure self-operating. It follows that, the angler does not have to jeck or manipulate the line in any difficult-to-handle and uncertain manner.

As will be hereinafter more fully understood, the lure is such in construction that it "nose dives." The over-all tackle requires no sinker and hence the lure does not station and anchor itself on the bottom of the water. A single continuous line ranges from the lure to the reel. The line can be reeled in until the cork and stop limit bead engage the tip of the pole or rod, a step which a sinker on the line would prevent. The line knot passes freely through the guide eyes on the rod, can wrap on the reel and can unwrap with the cast. There is no sinker or anchor to cope with. The cork, bead and coacting knot cause the lure suspended part of the line to check the descent whereupon the lure is brought to a halt and capsized. The lure is now readied to function, swims up to the surface, is automatically inverted and nose dives, sinks and swims down again completing the first cycle and adapts itself for a repeat performance.

The lure is the significant component. It comprises a hollow body or cylindrical shell open at the bottom and provided with a domical top which provides the diving nose. The hollow portion provides a main chamber which has the capacity to collect and trap a column of water. An auxiliary chamber is built into the top and has a gas discharge port communicating with the main chamber and defines a subordinate or auxiliary chamber which contains a water soluble substance (a calcium carbide pellet or powder) which generates and discharges a pressurized charge of gas through the port into the main chamber when contacted by the column of water, whereby to expel the water and render the then gas-charged body buoyant and causing it to float and swim upwardly to the water's surface. Self-shifting weight means is confined in said main chamber and is capable of capsizing the lure at the water's surface and then directing the top downwardly, whereby the lure noses down and descends through the water to complete a first cycle of operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in section and elevation of the improved lure with self-contained buoyancy changing means and which shows the lure in its vertically suspended position with the ball weight at the bottom of the cone;

FIG. 2 is a horizontal section taken on the plane of the section line 2—2 of FIG. 1;

FIG. 3 is a fragmentary sectional and elevational view taken on the vertical section line 3—3 of FIG. 1;

FIG. 4 is a diagrammatic view showing four of the steps or stages of operation wherein the lure is ascending from its initial low level position (at the left) and has travelled upwardly through the water surface and tilted to a ready-to-dive position at the right; and FIG. 5 is a further diagrammatic view showing the lure re-entering the water and how it descends to its initial starting position to complete the first cycle of operation, the last several positions of the lure appearing in phantom lines.

With reference first to FIG. 4 at the left it will be seen that the spherical cork or equivalent float is denoted by the numeral 8, said float being provided centrally with a passage for a portion of the fishing line. The portion of the line above the float is denoted at 10 and the portion of the line below the float is denoted at 11. The portion 10 is threaded through a passage provided therefor in a limit stop bead 12. The numeral 14 designates a knot which is tied in the line and is adapted to come to rest atop the bead 12 when the latter is in its limit stop position atop the float 8.

The improved float is denoted by the numeral 16 and is of the construction shown in FIGS. 1, 2, and 3. It comprises a hollow body, preferably a cylindrical shell 18 whose bottom 20 is open. The upper closed end of the body or shell is of domical form as denoted at 22 and this constitutes the diving nose of the body. This upper end portion is provided with an upstanding internally screw-threaded neck 24 spanned by a diaphragm 26 having a gas emitting or discharged port as at 28 which communicates with the hollow portion or main chamber 30. In actual practice the entire upper end of the body may be fashioned into a bullet-like nose or, alternatively, it may be of the construction shown in FIG. 1 wherein it will be seen that a hollow cap-like closure 32 is provided. The aforementioned diaphragm 26 is an integral component of the cap and provides the bottom wall of the hollow portion, which, in turn, constitutes an auxiliary chamber which is adapted to contain a water-soluble gas-generating product. More specifically, this product comprises a pellet 34 fitting into the auxiliary chamber portion provided therefor by way of a suitable attachable and detachable friction-retained cover or lid 36 having an eye 38 to which the lower end 40 of the suspended part of the fishing line is connected. The hollow portion 32 of the cap is shouldered to rest atop the neck 24 and is provided with a depending reduced screw-threaded neck 42 which is screwed into the neck 24. It will be understood that any suitable water soluble gas-generating substance may be satisfactorily used, such as calcium carbide. In practice, calcium carbide has been found to be efficient and satisfactory.

The lower open end portion of the hollow body or shell is provided with a centrally-positioned integrally-mounted spider 44 provided at its center with a pair of upstanding spaced parallel lugs or ears 46 which are apertured at 48 to retentively seat a ball-jointing member 50 on the lower constricted or apical end portion 52 of a movable conical cup 54 whose upper end 56 is of a diameter that it is spaced inwardly from the encompassing walls of the shell. The lugs and ball-jointing member provide a universal-type joint allowing the cup to turn and move from side to side as required in use. The upper end portion is provided with gas discharge orifices 58. The aforementioned rollable ball weight is denoted at 60 and is normally seated in the lower end portion 52 of the cup. It will be seen, however, that this ball is adapted to roll out of the cup and into the main chamber in progressive steps as illustrated diagrammatically in FIGS. 4 and 5. In actual practice any number of fishhooks 62 may be provided. This is to say, several hooks or just a pair of oppositely balanced hooks on the median exterior portion of the shell will take care of this aspect of the concept.

It will be evident that the lure is rigged as shown, for example, at the left in FIG. 4 with the bead 12 resting atop the float 8 and with the knot 14 engaging the bead 12 with the portion 11 of the line tied at 40 to the eye 38 as shown in FIG. 1.

It will be further understood that FIGS. 4 and 5 considered collectively show diagrammatically the ascending and descending and surfacing steps of the lure after it has been cast. The steps are conveniently noted (broadly of course) by the letters A, B, C, D, E, F, G and H.

In use when the fisherman has decided the depth at which he is intending to fish, he simply ties a knot 12 where wanted and makes his cast. The lure 16 dives or sinks until the line below the float or cork 8 tautens itself. The lure is then jerked by the line portion 11 and comes to a halt. This action causes the lure to capsize. This step in turn causes the ball weight 60 to come into play (FIG. 4). Accordingly, the weight is thrown to the bottom of the conical cup and stays put for a second or two until the column of water (not shown) entering through the open bottom 20 makes contact with the gas-generating pellet. The gas thus generated causes the column of water to be forcibly expelled through the open bottom 20 and the emptied main chamber 30 fills up with gas and results in the buoyancy change desired. The lure is now amply buoyant to ascend and "swim" to and through the surface (FIG. 4). The weight of the ball 60 acts as a balance and keeps the lure in a vertical (or substantially so) position until the surface is reached and when there the lure tilts (in any direction) and the ball rolls out of its universally mounted nesting cone 54 resulting in the lure tilting further until the gas escapes. At this state (as shown diagrammatically at D and E) the ball rolls into the nose of the lure. Now that the gas has been expelled, the main chamber 30 fills with water again and, with the ball back in the cone, the lure is caused to dive rapidly until the end of the line H is reached and it capsizes again as at the starting point. This cycle of swimming up and down is repeated over and over until the gas generating pellet is no longer operable and has to be replaced.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:
1. A fishing lure comprising a plug-type hollow body having an open bottom and a closed top, the hollow portion of said body constituting and providing a main chamber capable of collecting and momentarily trapping a column of water, an auxiliary exteriorly closed chamber embodied in the top of said body and having an internal port communicating with said main chamber, said auxiliary chamber being adapted to contain a water-soluble gas-generating substance capable of generating and discharging a pressurized charge of gas through said port into said main chamber when contacted by the water as it accumulates and rises in said main chamber, whereby to expel the water and render the then gas-charged body buoyant and causing it to float and swim upwardly to the water's surface, and self-shifting weight means confined in said main chamber and capable of capsizing the lure at the water's surface and then directing the top downwardly, whereby the lure noses down and descends through the water to complete a first cycle of operation, said weight means comprising a freely rollable ball of prescribed weight, and a cup-like receiver mounted in the bottom portion of said main chamber, said ball weight being located at the bottom of said chamber at the starting and finishing steps of said cycle of operation but progressively rolling from said receiver into the median and top areas of said main chamber in a manner to tilt and invert the lure when it emerges and pops upwardly through said surface preparatory to inverting and initiating the progressive nose diving and descending steps of said single cycle of travel.

2. The structure according to claim 1, and wherein said cycle of travel is repeated over and over until the gas generating substance is used up.

3. The structure according to claim 1, and wherein said receiver comprises a conical cup whose apical end is disposed downwardly and is mounted in the bottom portion of said body.

4. The structure according to claim 1, and wherein said receiver comprises a conical cup whose apical end is disposed downwardly and is mounted in the bottom portion of said body, said mounting means for said apical end embodying a universal joint which permits the cup to have freedom of action within the confines of said main chamber and which contributes to the step-by-step sequence and freedom of movement of the ball weight from the receptacle portion of the cup into the main chamber and its subsequent step-by-step automatic return from said main chamber to the receptacle portion at the bottom.

5. A fishing lure comprising a cylindrical shell providing a hollow body and defining a main chamber the top of said shell being domical, providing a diving nose and having an auxiliary chamber adapted to contain a water-soluble gas-generating pellet, said auxiliary chamber having a gas discharge port communicating with the upper area of said main chamber, said shell being open at its bottom and provided thereacross with a spider, a conical cup confined in said main chamber and having its lower apical end connected by a universal type ball joint to the central portion of said spider, said cup being provided with vent openings and having its upper open mouth portion terminating at a plane adjacent the median portion of said main chamber, a freely rollable weighted ball normally seated in the bottom part of said cup, and said shell being provided exteriorly with fishhook means.

6. For use in conjunction with fishing tackle of the class described, an animated lure comprising, an elongated hollow ascending and descending body open at its bottom and provided across said bottom with a spider, provided at its top with an outstanding internally screw-threaded neck, the hollow portion of said body providing a main chamber, a hollow cap-like closure having a depending screw-threaded neck screwed into said first-named neck, the hollow portion of said closure constituting an auxiliary chamber designed and adapted to contain a water-soluble gas-generating pellet, said depending neck having a diaphragm provided with an aperture defining a gas discharge port in constant communication with an adjacent upper portion of said main chamber, a cup situated in a coacting lower portion of said main chamber, said cup having a lower end operatively joined to said spider and an upper open end providing an open mouth emptying into the median and upper portions of said main chamber, and a self-shifting freely rollable weighted ball normally seated in the lower end of the receptacle portion of said cup and rollable from said cup into the upper portion of said main chamber in a manner to act on and capsize the over-all lure and to direct the upper end downwardly preparatory to making a nose dive and descending into the water which is being fished.

7. The lure defined in and according to claim 6, and wherein said cup is conical, the apical lower end of said cup being connected by a universal joint to said spider, the upper open mouth terminating in a plane adjacent the median portion of said main chamber and being of a diameter slightly less than the diameter of said main chamber and having its lip portion spaced from but proximal to the encompassing wall portions of said chamber.

References Cited
UNITED STATES PATENTS

| 2,734,303 | 2/1965 | Peck et al. | 43—44.9 X |
|---|---|---|---|
| 2,791,062 | 5/1957 | Hirsch et al. | 46—92 |
| 2,805,511 | 9/1957 | Cicala | 43—42.06 |
| 2,932,916 | 4/1960 | Strickland | 46—92 |
| 3,044,207 | 7/1962 | Dorsett | 43—42.06 X |

SAMUEL KOREN, *Primary Examiner.*

ALDRICH F. MEDBERY, *Examiner.*

D. J. LEACH, *Assistant Examiner.*